(12) United States Patent
Kwon et al.

(10) Patent No.: US 10,486,277 B2
(45) Date of Patent: Nov. 26, 2019

(54) ELECTROMAGNETIC CHUCK MOUNTING STRUCTURE

(71) Applicant: HWACHEON MACHINE TOOL CO., LTD., Gwangju (KR)

(72) Inventors: Hyoung Woon Kwon, Gwangju (KR);
Kyu Yong Yeom, Anyang-si (KR);
Kyung Hwan Kang, Gwangju (KR);
Dae Yu Park, Seoul (KR); Yoon Jong Park, Gwangju (KR); Seong Jun Moon, Gwangju (KR)

(73) Assignee: HWACHEON MACHINE TOOL CO., LTD., Gwangju (KR)

( * ) Notice: Subject to any disclaimer, the term of this patent is extended or adjusted under 35 U.S.C. 154(b) by 164 days.

(21) Appl. No.: 15/800,484

(22) Filed: Nov. 1, 2017

(65) Prior Publication Data
US 2018/0169808 A1 Jun. 21, 2018

(30) Foreign Application Priority Data
Dec. 16, 2016 (KR) .................. 10-2016-0172973

(51) Int. Cl.
*B23Q 3/154* (2006.01)
*H01F 7/02* (2006.01)

(52) U.S. Cl.
CPC .......... *B23Q 3/1543* (2013.01); *H01F 7/021* (2013.01); *H01F 7/0257* (2013.01); *B23Q 2703/02* (2013.01)

(58) Field of Classification Search
CPC .............................. B23B 31/28; B23Q 3/1543
See application file for complete search history.

(56) References Cited

U.S. PATENT DOCUMENTS

| 3,722,360 A * | 3/1973 | Blakey | .................. B23Q 3/107 33/545 |
| 7,999,645 B2 * | 8/2011 | Sarda | .................... B25B 11/002 269/85 |

(Continued)

FOREIGN PATENT DOCUMENTS

| KR | 20-0203324 Y1 | 11/2000 |
| KR | 10-0708013 B1 | 4/2007 |

(Continued)

*Primary Examiner* — Mohamad A Musleh
(74) *Attorney, Agent, or Firm* — Novick, Kim & Lee PLLC; Jae Youn Kim

(57) ABSTRACT

Provided is an electromagnetic chuck mounting structure capable of tightly and fixedly mounting an electromagnetic chuck on a table without fluctuation, having light weight, and making a low profile when an electromagnetic chuck is mounted on the table. The structure includes: a mounting groove recessed on an upper surface of the table and located inward of an edge of the table; a plurality of mounting holes formed at regular intervals on the mounting groove to fix the electromagnetic chucks to be mounted; and an adhesive filled and cured on the mounting groove and between the mounted electromagnetic chucks, wherein each of the electromagnetic chucks is fixedly fastened to each of the mounting holes by one fastening bolt, such that an upper surface of each electromagnetic chuck is aligned on a same plane with the upper surface of the table or protrudes from the upper surface of the table.

6 Claims, 4 Drawing Sheets

(56) References Cited

U.S. PATENT DOCUMENTS

| | | | |
|---|---|---|---|
| 8,031,038 B2* | 10/2011 | Kimura | B29C 45/1742 |
| | | | 335/285 |
| 2010/0013583 A1* | 1/2010 | Kimura | B29C 45/1742 |
| | | | 335/294 |
| 2015/0279536 A1* | 10/2015 | Ding | H01F 7/0252 |
| | | | 335/289 |

FOREIGN PATENT DOCUMENTS

| KR | 10-1059773 B1 | 8/2011 |
|---|---|---|
| KR | 10-2011-0111290 A | 10/2011 |
| KR | 10-1430152 B1 | 8/2014 |
| KR | 10-2016-0106288 A | 9/2016 |

\* cited by examiner

ELECTROMAGNETIC CHUCK MOUNTING STRUCTURE

BACKGROUND OF THE INVENTION

1. Field of the Invention

The present invention relates to an electromagnetic chuck mounting structure, and more particularly, to an electromagnetic chuck mounting structure capable of tightly and fixedly mounting an electromagnetic chuck on a table without fluctuation, having light weight, and making a low profile when the electromagnetic chuck is mounted on the table.

2. Description of the Related Art

In general, a chuck of a machine tool is a component installed on an upper portion of a table of the machine tool to fix a workpiece to be processed, and typically includes a general chuck, an air chuck, a collet chuck and the like, as well as an electromagnetic chuck installed on the table to attach the workpiece by using a magnet for processing of the workpiece.

Herein, the electromagnetic chuck will be described among the above-mentioned various chucks.

The electromagnetic chuck receives power to fixedly and easily attach the workpiece, which is an object to be processed, without using additional fixing devices.

The related art for the electromagnetic chuck as described above is disclosed in Korean utility model registration publication No. 20-0203324, Korean patent registration publication No. 10-0708013, and Korean patent registration publication No. 10-1430152 (hereinafter referred to as "related documents").

However, the electromagnetic chuck disclosed in the above-mentioned related art is manufactured separately from the table of the machine tool, which supports a workpiece, and installed on the upper portion of the table. When the electromagnetic chuck, which is manufactured separately from the table, is installed on the table, the distance between a tool and the table of the machine tool becomes short, so that the height of the workpiece to be processed is limited, and the weight of the two devices is applied to the machine tool, so that the machine tool becomes unnecessarily heavy.

Meanwhile, another related art for the conventional electromagnetic chuck is disclosed in Korean unexamined patent publication No. 10-2011-0111290 (hereinafter referred to as "related document 1"), which proposes technology such as a clamping device for providing the connection of bed-to-base and base-to-workpiece support plate like one-piece condition by ensuring contact between the entire extension of a base and a bed of the machine tool and between the base and a plate.

In addition, as disclosed in Korean patent registration publication No. 10-1059773 (hereinafter referred to as "related document 2"), there is proposed technology such as a dual electro permanent magnetic vise for efficiently processing the workpiece, in which a dual electro permanent electromagnetic vise for clamping the workpiece in a processing machine is entirely or partially magnetized selectively, so that the vise independently clamps for each channel according to the characteristics of the workpiece such as the size.

In addition, as disclosed in Korean unexamined patent publication No. 10-2016-0106288 (hereinafter referred to as "related document 3") filed by applicant of the present invention, there is proposed technology such as an machining tool table associated with an electromagnetic chuck, in which electromagnets constituting the electromagnetic chuck is integrated with the table, so that a table structure of the machine tool is simplified to solve limitations of the weight and height of the workpiece mounted on the table, and to prevent a power cable supplied to the electromagnetic chuck from being twisted or broken.

RELATED DOCUMENTS

Patent Document

Korean unexamined patent publication No. 10-2011-0111290
Korean patent registration publication No. 10-1059773
Korean unexamined patent publication No. 10-2016-0106288

SUMMARY OF THE INVENTION

However, related document 1 has the same problems as the related documents.

Related document 2 provides the convenience for use, whereas a technical structure is considerably complicated and the control according to the complicated structure is also considerably inconvenient, errors are frequently incurred, and initial production costs are excessive.

Related document 3 has some disadvantages same as that of the related documents due to a cover for covering the electromagnet.

To solve the problems described above, a major object of the present invention is to provide an electromagnetic chuck mounting structure capable of tightly and fixedly mounting an electromagnetic chuck on a table without fluctuation, having light weight, and making a low profile when the electromagnetic chuck is mounted on the table.

Another object of the present invention is to replace only a part of the electromagnetic chuck making contact with the workpiece, not the entire electromagnetic chuck, when the electromagnetic chuck fixedly attached to the workpiece is abraded.

Still another object of the present invention is to provide electromagnetic chucks configured as unit cells arranged in a plurality of regions, so that a magnetized portion can be freely selected based on the regions corresponding to an area of the workpiece.

To achieve the objects of the present invention for solving the problems described above, there is provided a mounting structure for electromagnetic chucks that receive power to fixedly attach a workpiece to a table of a machine tool, the mounting structure including: a mounting groove recessed on an upper surface of the table and located inward of an edge of the table; a plurality of mounting holes formed at regular intervals on the mounting groove to fix the electromagnetic chucks to be mounted; and an adhesive filled and cured on the mounting groove and between the mounted electromagnetic chucks, wherein each of the electromagnetic chucks is fixedly fastened to each of the mounting holes by one fastening bolt, such that an upper surface of each electromagnetic chuck is aligned on a same plane with the upper surface of the table or protrudes from the upper surface of the table.

The electromagnetic chuck may include: an electromagnet in a form of a core in which a coil is wound from a lower portion of the core and a fastening bolt is inserted into a center of the core; and a chuck block disposed on an upper portion of the electromagnet and inserted therein with the fastening bolt.

The mounting structure may further include a permanent magnet embedded inside the adhesive and disposed between the chuck blocks.

The chuck block may be divided into a fixed chuck pole block embedded inside the adhesive, and a contact chuck block detachably provided on an upper portion of the fixed chuck pole block so as to be replaceable when abraded due to contact with the workpiece.

The mounting groove may be divided into a plurality of mounting grooves such that a plurality of electromagnetic chucks mounted in the mounting hole are divided in the form of unit cells.

The mounting grooves divided into the unit cells may have a same area or mutually different areas.

The present invention allows to tightly and fixedly mount the electromagnetic chuck on the table without fluctuation, to have light weight, and to make a low profile when the electromagnetic chuck is mounted on the table, so that when processing workpieces, precision machining can be performed, and a relatively heavy workpiece can be put and processed on the table since the table is light in weight, while a processable height according to the design of the machine tool is maintained, so that a workpiece having high height is conveniently processed.

In addition, only a part of the electromagnetic chuck making contact with the workpiece, not the entire electromagnetic chuck, is replaced when the electromagnetic chuck fixedly attached to the workpiece is abraded, so that the convenience for use and high economic efficiency are provided.

In addition, when the electromagnetic chuck is partially abraded, since the electromagnetic chuck can be assembled to and dissembled from an upper portion of the electromagnetic chuck, only the abraded portion of the electromagnetic chuck can be easily replaced, so that the productivity and assembling performance can be improved, and the stability and convenience in maintenance can be ensured. Accordingly, superior safety and convenience can be guaranteed through the fixation of the workpiece, and the workpiece is prevented from being fluctuated during the processing.

DETAILED DESCRIPTION OF THE INVENTION

Hereinafter, preferable embodiments of the present invention will be described in detail with reference to the accompanying drawings as follows, but the present invention is not limited or restricted to the embodiments.

Figure 1:
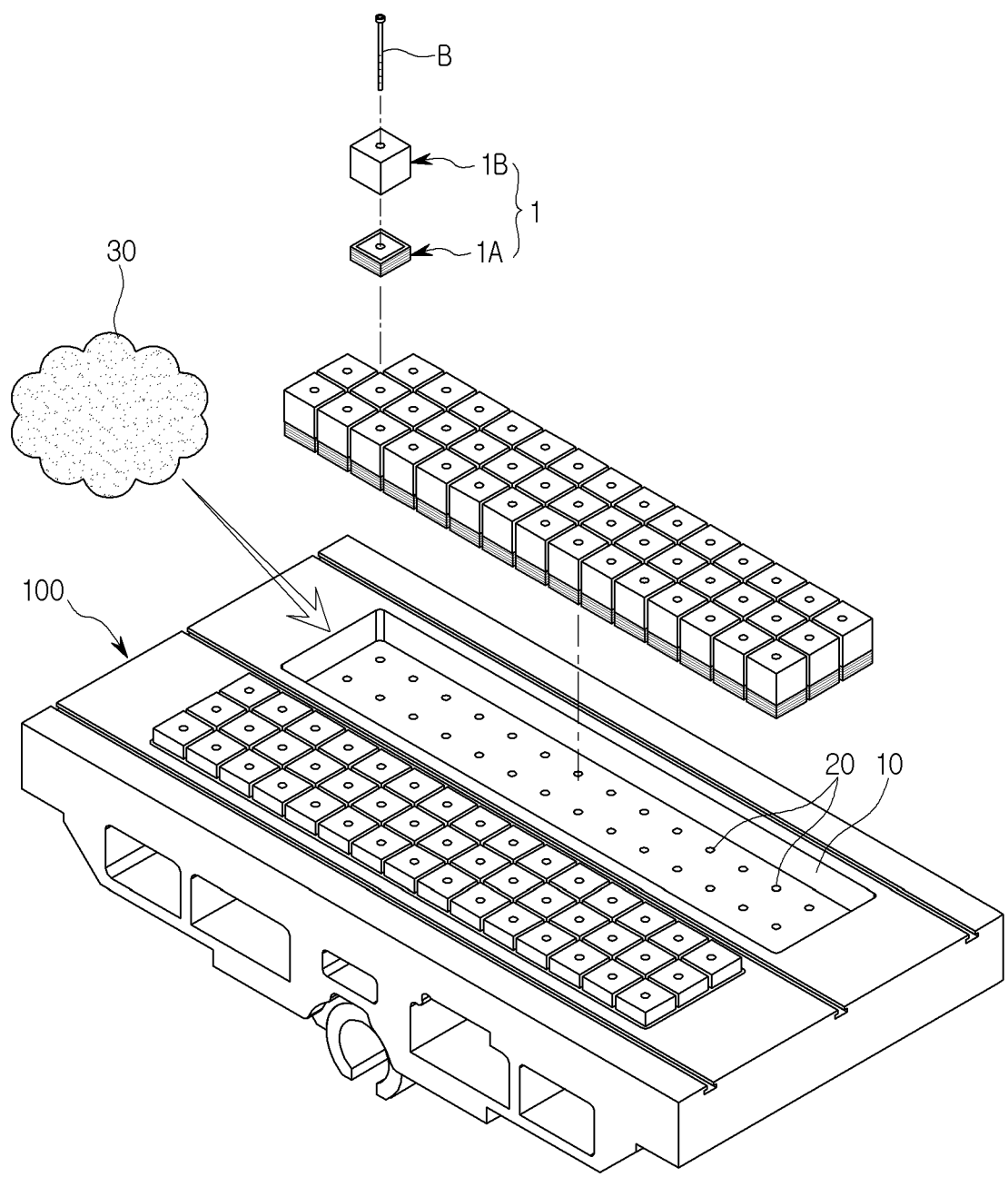
FIG. 1 is an exploded perspective view for explaining the present invention.
Figure 2:
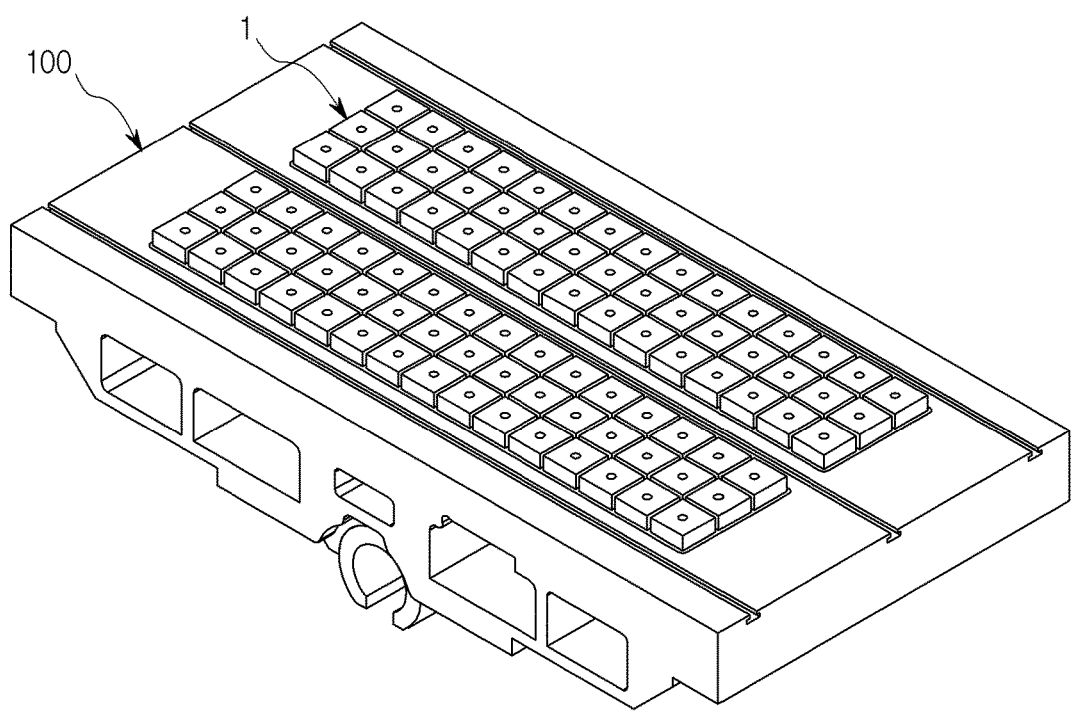
FIG. 2 is a perspective view showing an assembled state according to FIG. 1.
Figure 3:
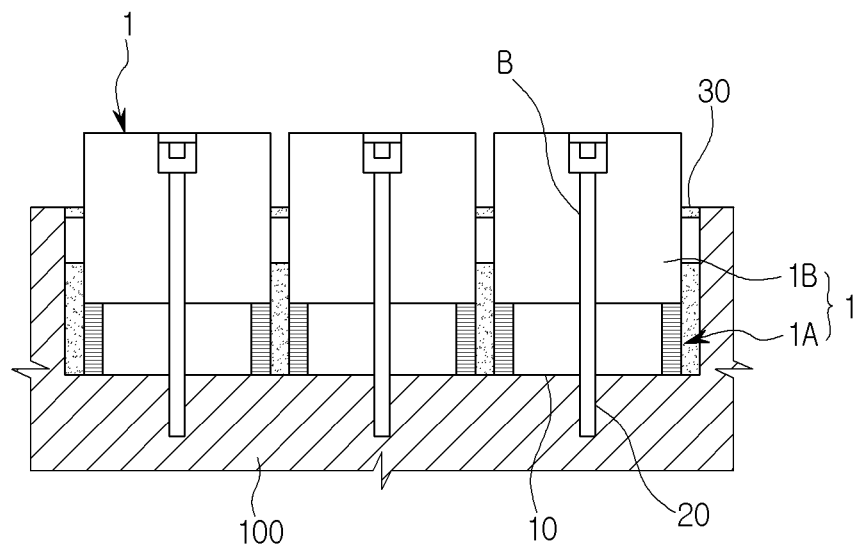
FIG. 3 is a partial enlarged sectional view according to FIG. 2.

FIG. 1 is an exploded perspective view for explaining the present invention, FIG. 2 is a perspective view showing an assembled state according to FIG. 1, and FIG. 3 is a partial enlarged sectional view according to FIG. 2.

As shown in the drawings, an electromagnetic chuck 1 is a component provided on a table 100 of a machine tool and receives power to fixedly attach a workpiece, which is an object to be processed.

The present invention allows to tightly and fixedly mount the electromagnetic chuck on the table without fluctuation, to have light weight, and to make a low profile when the electromagnetic chuck is mounted on the table.

A mounting structure for electromagnetic chucks 1 according to the present invention includes: a mounting groove 10 recessed on an upper surface of a table 100 and located inward of an edge of the table 100; a plurality of mounting holes 20 formed at regular intervals on the mounting groove 10 to fix the electromagnetic chucks 1 to be mounted; and an adhesive 30 filled and cured on the mounting groove 10 and between the mounted electromagnetic chucks 1, wherein each of the electromagnetic chucks 1 is fixedly fastened to each of the mounting holes 20 by one fastening bolt B, such that an upper surface of each electromagnetic chuck 1 is aligned on a same plane with the upper surface of the table 100 or protrudes from the upper surface of the table 100.

Since the mounting groove 10 is recessed from the upper surface of the table 100 for arranging the electromagnetic chuck 1, the overall weight of the table 100 can be lightened, so that the workpiece, which is an object to be processed and has heavy weight, is put and processed on the table 100. In addition, as the adhesive is filled between the electromagnetic chuck and the mounting groove after the electromagnetic chuck is mounted in the mounting groove, the weight of the table can be reduced.

In addition, the electromagnetic chuck has a structure that only a partial upper portion of the electromagnetic chuck on which the workpiece, which is the object to be processed, is put protrudes, and the remaining portion of the electromagnetic chuck is inserted into the mounting groove recessed from the upper surface of the table, so that the distance between the tool and the table of the machine tool is maximized. Accordingly, even if the height of the workpiece to be processed is high, the processing can be smoothly performed.

The electromagnetic chuck 1 includes an electromagnet 1A in a form of a core in which a coil is wound from a lower portion of the core and a fastening bolt B is inserted into a center of the core, and a chuck block 1B disposed on an upper portion of the electromagnet 1A and inserted therein with the fastening bolt 1B, such that a magnetic force is transmitted from the electromagnet to fixedly attach the workpiece, which is the object to be processed, by the magnetic force.

In this manner, the electromagnetic chuck is primarily and fixedly fastened by the fastening bolt to the mounting hole disposed on the mounting groove of the table, and then fixed again by the adhesive filled between the electromagnetic chucks and between the electromagnetic chuck and the table, so that the fixedly mounted electromagnetic chuck is firmly, tightly, and fixedly mounted without fluctuation. In addition, as the electromagnetic chuck is fixed by the fastening bolt and the adhesive, the overall weight of the table can be maintained in a light-weight state without being increased.

Accordingly, since movement does not occur during a process of putting and processing the workpiece on the table, precision machining can be easily performed.

Thus, according to the present invention, the electromagnetic chuck is fixed again by the adhesive in a state that the electromagnetic chuck is fixedly fastened on the mounting grooves recessed on the upper surface of the table and a plurality of mounting holes formed in the mounting grooves, so that the electromagnetic chuck is tightly and firmly mounted without fluctuation, and the overall weight is remarkably reduced.

In addition, since the electromagnetic chuck is mounted on the table in a state that the electromagnetic chuck is inserted into the mounting groove of the table, a processing height between the tool of the machine tool and the workpiece to be processed is maximized, so that the handling and processing of the workpiece having high height can be easily performed.

Figure 4:
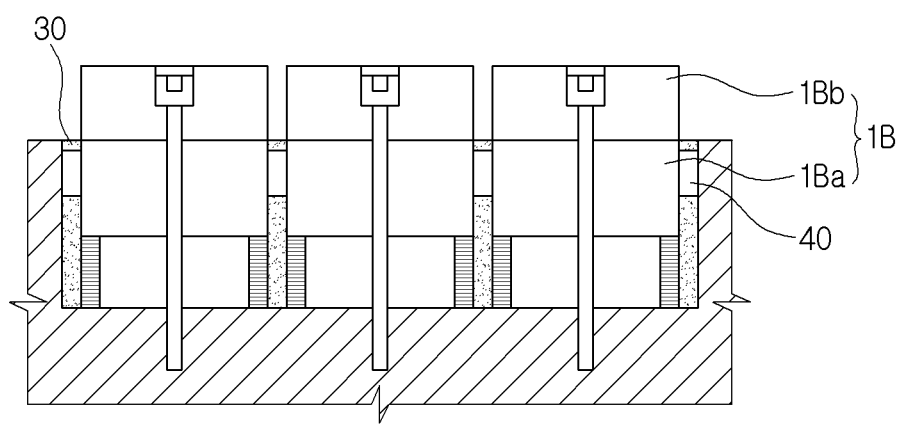
FIG. 4 is a sectional view for explaining another embodiment of the present invention.

FIG. 4 is a sectional view for explaining another embodiment of the present invention.

In the configuration as shown above, the electromagnetic chuck can be provided with a higher fixing force for fixedly attaching the workpiece to be processed.

A permanent magnet 40 embedded inside the adhesive is further included between the chuck blocks 1B on which the workpiece to be processed.

In other words, a general permanent magnet is interposed between the chuck blocks in a state that the electromagnetic chuck is fixedly fastened by the fastening bolt to the mounting hole of the mounting groove, and then the adhesive is filled, such that the permanent magnet is embedded inside the adhesive.

Meanwhile, the chuck block 1B is divided into a fixed chuck pole block 1Ba embedded inside the adhesive 30, and a contact chuck block 1Bb detachably provided on an upper portion of the fixed chuck pole block 1Ba so as to be replaceable when abraded due to contact with the workpiece. The permanent magnet 40 is located adjacent to the fixed chuck pole block 1Ba embedded in the adhesive among the chuck block 1B.

In other words, the chuck block is abraded due to friction with the workpiece as the workpiece to be processed is loaded on the chuck block for the processing and then unloaded from the chuck block after the processing. The entire portion of the chuck block is not replaced, and only the abraded portion of the chuck block, that is, the contact chuck block on which the workpiece is directly loaded is separated for replacement, so that the high economic efficiency is obtained and the convenience for use is remarkably improved. The detachment can be achieved by separating the fastening bolts.

Figure 5:
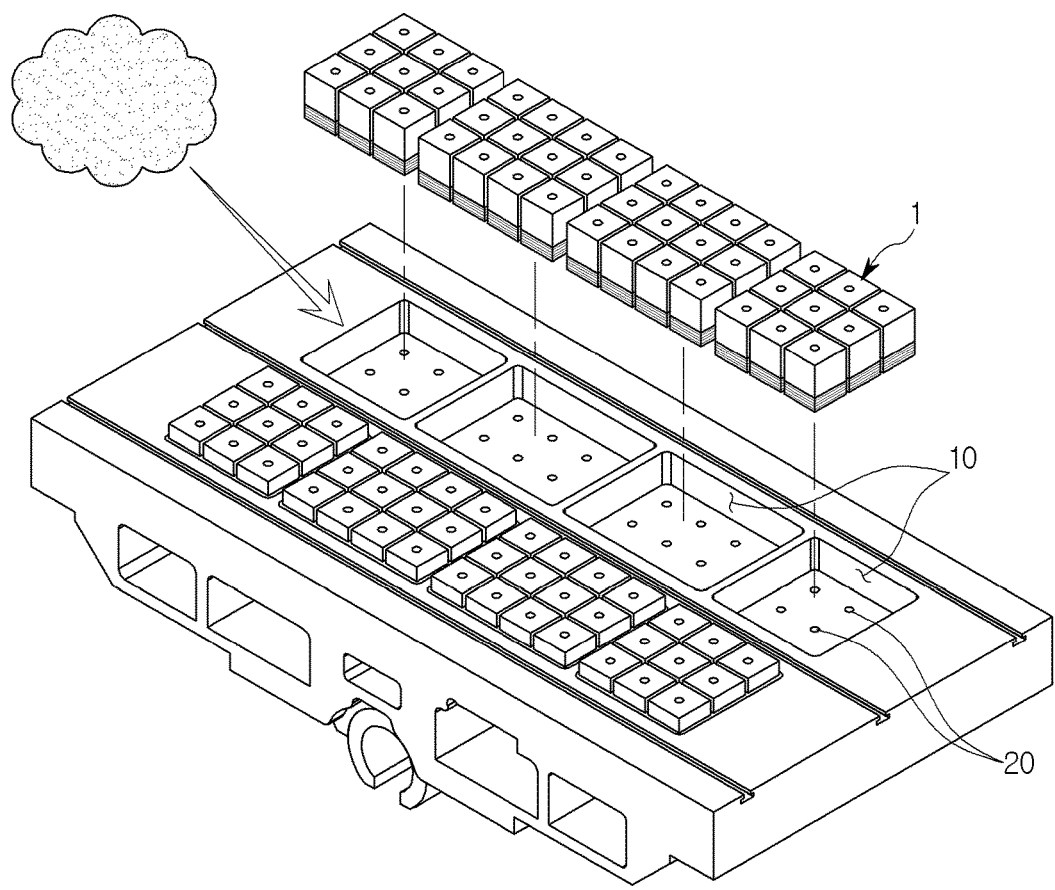
FIG. 5 is a partial exploded perspective view for explaining still another embodiment of the present invention.

FIG. 5 is a partial exploded perspective view for explaining still another embodiment of the present invention.

In the configuration as shown above, as the electromagnetic chuck provided on the table is uniformly distributed over the entire upper surface of the table, a workpiece having a relatively large area can be smoothly and fixedly attached, but it is ineffective to put and fixedly mount a workpiece having a small area on the electromagnetic chuck, so a technical configuration that can solve the problem is provided.

The mounting groove 10 is divided into a plurality of mounting grooves such that a plurality of electromagnetic chucks 1 mounted in the mounting hole 20 are divided into general unit cells. The mounting grooves divided into the unit cells have a same area or mutually different areas. The electric power of the electromagnetic chuck can be individually controlled or collectively controlled by a general control unit.

In other words, since the mounting groove on which the electromagnetic chuck is mounted is divided into unit cells, the electromagnetic chuck to be mounted on the mounting groove is also partitioned in the form of unit cells, so that rows of magnetized bodies can be appropriately selected and used according to the size of the workpiece.

In other words, dividing in the form of unit cells and forming in a same area or mutually different areas allow the workpiece to be selectively put and processed according to the workpiece, which is the object to be processed, so that the convenience for use as well as the efficiency is further improved.

In addition, if the workpiece is a small-sized workpiece, the processing efficiency is also maximized by putting several workpieces on the electromagnetic chuck divided in the form of unit cells at one time, and providing several tools correspondingly to the workpieces for the simultaneous processing of the workpieces.

Thus, the mounting groove in which the electromagnetic chuck is mounted is formed in the form of unit cells, and the electromagnetic chuck is mounted correspondingly to the mounting groove, so that the processing efficiency as well as the convenience for selective use according to the size of the workpiece is further increased.

What is claimed is:

1. A mounting structure for a plurality of electromagnetic chucks that receive power to fixedly attach a workpiece to a table of a machine tool, the mounting structure comprising:
   a mounting groove recessed on an upper surface of the table and located inward of an edge of the table;
   a plurality of mounting holes formed at regular intervals on the mounting groove to fix the plurality of electromagnetic chucks to be mounted; and
   an adhesive filled and cured on the mounting groove and between the mounted plurality of electromagnetic chucks,
   wherein each of the plurality of electromagnetic chucks is fixedly fastened to each of the plurality of mounting holes by one fastening bolt, such that an upper surface of the each of the plurality of electromagnetic chucks is aligned on a same plane with the upper surface of the table or protrudes from the upper surface of the table,
   wherein the each of the electromagnetic chucks comprises:
      an electromagnet core in which a coil is wound from a lower portion of the electromagnet core and a fastening bolt is inserted into a center of the electromagnet core; and
      a chuck block disposed on an upper portion of the electromagnet core and inserted therein with the fastening bolt, and
   wherein the chuck block is divided into a fixed chuck pole block embedded inside the adhesive and a contact chuck block detachably provided on an upper portion of the fixed chuck pole block so as to be replaceable when abraded due to contact with the workpiece.

2. The mounting structure of claim 1, further comprising a permanent magnet embedded inside the adhesive and disposed between the chuck blocks.

3. The mounting structure of claim 1, wherein the mounting groove is divided into a plurality of mounting grooves such that the plurality of electromagnetic chucks mounted in the plurality of mounting hole are divided into unit cells.

4. The mounting structure of claim 3, wherein the plurality of mounting grooves divided into the unit cells have a same area or mutually different areas.

5. The mounting structure of claim 2, wherein the mounting groove is divided into a plurality of mounting grooves such that the plurality of electromagnetic chucks mounted in the plurality of mounting hole are divided into unit cells.

6. The mounting structure of claim 5, wherein the plurality of mounting grooves divided into the unit cells have a same area or mutually different areas.

* * * * *